Figure 2:
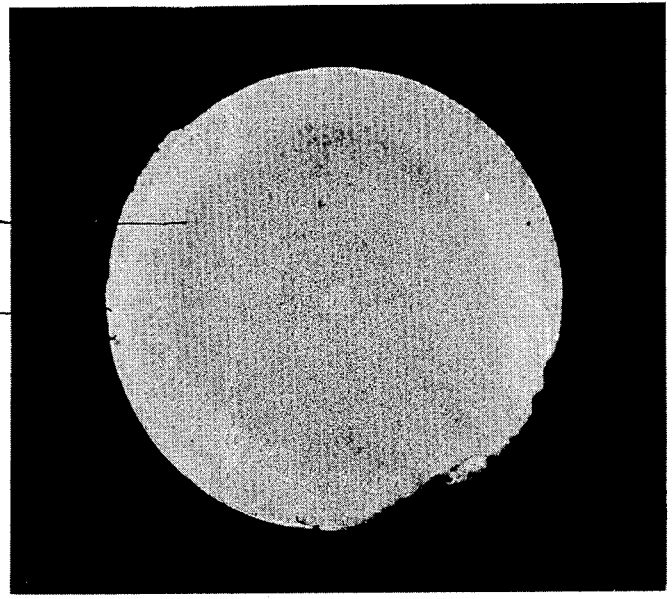

Oct. 26, 1965 F. A. STEPHENS ETAL 3,214,267

PRODUCTION OF GREY CAST IRON

Filed May 1, 1963

INVENTORS
FREDERICK A. STEPHENS
OSCAR G. SPECHT

BY Frederick J. McCarthy Jr.

ATTORNEY

United States Patent Office 3,214,267
Patented Oct. 26, 1965

3,214,267
PRODUCTION OF GREY CAST IRON
Frederick A. Stephens, Youngstown, and Oscar G. Specht, Lewiston, N.Y.; said Stephens assignor to Union Carbide Corporation, a corporation of New York
Filed May 1, 1963, Ser. No. 280,185
3 Claims. (Cl. 75—43)
(Filed under Rule 47(b) and 35 U.S.C. 118)

This invention relates to a process for the production of grey cast iron and to an addition agent for use in the process.

In the manufacture of grey cast iron it is common practice to charge pig iron, steel scrap, fluxing agents, and fuel such as coke into an acid cupola. In addition, various alloy addition agents are added to control the composition and properties of the grey cast iron being produced. The proportions of the various ingredients in the charge are determined in large measure by the composition and characteristics desired in the metal to be produced. In addition allowance must be made in the proportions of additions for losses of the charge elements.

The two most influential elements with respect to the physical and mechanical properties of grey cast iron are carbon and silicon. In acid cupola practice, carbon content is determined primarily by that charged with the metal constituents of the mix. Since at least 90 percent of the coke fuel is consumed in combustion, only a very minor amount of carbon is introduced by the coke. Silicon is generally added in the form of silvery iron or ferrosilicon to compensate for the lack of silicon in the steel scrap.

Since the major source of carbon for the grey cast iron comes from the metallic components of the charge, the carbon content of the final grey cast iron is varied by altering the proportions of pig iron to steel scrap in the charge. The silicon content in the product primarily determines the ratio between graphite and cementite in the grey cast iron but only to a minor extent affects the total carbon content in the ranges normally present in such iron.

It would be desirable for the cupola operator to be able to alter the ratio of pig iron to steel scrap in order to take advantage of relative changes in cost of the two materials and in addition to allow for the availability of the charge materials. However, since the major source of carbon in the final product is determined by the carbon content of the pig iron and steel scrap, the ratio of pig iron to steel scrap is fixed within rather narrow limits for the production of any particular grade of grey cast iron.

It is an object of this invention to provide a process for the production of grey cast iron from pig iron and steel scrap wherein the ratio of charge metals may be varied over wide limits at the will of the cupola operator.

It is another object of this invention to provide a metallurgical briquette for use in the acid cupola production of grey cast iron which will improve the castability and also the overall final properties of the product cast iron.

Figure 1:
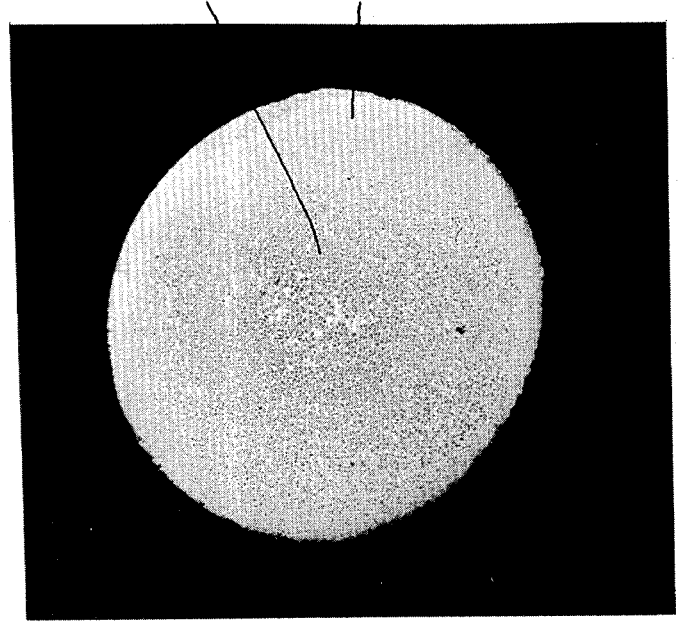

Other objects will be apparent from the subsequent disclosure and appended claims in conjunction with the drawing in which FIGURES 1 and 2 are enlarged photographs of cast iron test bar-cross-sections.

The objects of the invention are achieved by preparing a cupola charge of pig iron and steel scrap in a ratio to provide less than the amount of carbon necessary in the final grey cast iron product and adding thereto a novel graphite-silicon briquette having the composition of 25 to 50 weight percent silicon, 12 to 35 weight percent graphite, 0 to 25 weight percent chromium, 0 to 10 weight percent manganese, 5 to 20 weight percent of an inorganic siliceous binder, the balance being iron and incidental impurities, and the ratio of the silicon to graphite in the briquette being about 1 to 1 up to about 3 to 1; this charge is then melted in the acid cupola by standard techniques to provide the desired grey cast iron. The briquettes are added to the cupola charge is an amount sufficient to supply the deficiency in carbon as well as to supply any desired manganese and/or chromium.

The briquettes may be prepared from elemental metals but are most advantageously composed from ferroalloys. The graphite may be added in any suitable form of natural or synthetic graphite. Typical alloys suitable for use in compounding the briquettes include ferrochromium-silicon, ferrosilicon-chromium, silicomanganese, ferromanganese, ferrosilicon and high carbon ferrochromium. The high carbon ferrochromium is preferably utilized only for minor adjustments in composition. Similarly, elemental silicon may also be used when needed to make minor adjustments in composition. The briquette compositions are preferably sized into two ranges, 2 mesh by 5 mesh and 5 mesh by down (Tyler Standard Screen Series). The two differently sized materials may be blended as necessary to regulate the apparent density of the briquette so that briquettes of standard size and weight may be prepared with compositions varying throughout the aforementioned composition ranges. As was stated, the binder may be an inorganic siliceous material. Thus, sodium silicate is a suitable binder; however, the preferred binders are Portland cement of both the standard grade and quick setting type. The briquette materials are blended in proper proportions, mixed with water and compacted in a briquette press following normal practice. No special techniques or precautions need be observed in this operation.

To illustrate the invention a series of tests were run in the production of hard, medium and soft grey cast iron, first using standard techniques and then using the process of the present invention. These are presented in the following examples:

*Example 1*

In order to produce hard iron by previous techniques, a cupola charge was prepared containing 929 pounds of malleable pig iron, 960 pounds of steel scrap, 95 pounds of ferrosilicon briquettes, and 14 pounds of cement binder for a total charge of 1970 pounds. The ferrosilicon briquettes had the nominal composition of 40.0 weight percent silicon, 9.0 weight percent manganese, 8.6 weight percent chromium, the remainder iron and binder. These materials were melted in the cupola. The recoveries of materials in the hard grey cast iron so produced were silicon 80 percent, carbon 95.5 percent, chromium 100 percent, and manganese 95 percent.

Following the practice of the present invention, a cupola charge was prepared to produce the same composition hard grey cast iron as above, but utilizing a pig iron to steel scrap ratio of a little over about 0.26 to 1 as compared to the previous ratio of about 0.96 to 1. The cupola charge comprised 383 pounds of malleable pig iron, 1,440 pounds of steel scrap, 160 pounds of the novel graphite-silicon briquettes of the present invention and 13 pounds of cement binder. The recoveries of materials in the hard grey cast iron produced in accordance with the present invention were silicon 80 percent, carbon 85.5 percent, chromium 100 percent, and manganese 95 percent. The hard grey irons produced by the two processes had substantially the same composition. No changes in melting practice were required with the different charges and ratio of pig iron to steel scrap.

*Example II*

The procedure of Example I was repeated with charges adapted for the production of medium grade grey cast iron. The first charge, in accordance with standard practice, comprised 962 pounds of malleable pig iron, 840 pounds of steel scrap, 115 pounds of ferrosilicon briquettes, and 17 pounds of cement binder. Adjusted for losses to the slag, the nominal size of the batch was 1900 pounds. The ferrosilicon briquettes had the nominal composition: silicon, 36.4 weight percent; carbon, nil; chromium, 3.3 weight percent; manganese, 1.8 weight percent; balance, iron and binder.

The second charge, in accordance with the present invention, comprised 258 pounds of malleable pig iron, 1460 pounds of steel scrap; 200 pounds of the novel graphite-silicon briquettes of the present invention, and 18 pounds of a cement binder. Again, the nominal size of the charge, adjusted for losses to slag, was 1900 pounds.

The novel graphite-silicon briquettes had the nominal composition: silicon, 30.8 weight percent; graphite, 23.0 weight percent; chromium, 1.8 weight percent; manganese, 3.4 weight percent; balance, iron and binder; and a silicon-to-graphite ratio of 1.34.

Each of the charges was fed, in two separate operations, to an acid lined cupola, and melted therein. Again, products of substantially the same composition were obtained with no change in melting practice even though the pig iron-to-steel scrap ratio was about 1.17 for the first charge and about 0.18 for the second. The silicon, chromium, and manganese recoveries were 83 percent, 100 percent, and 95 percent, respectively, in each case. The carbon recovered was 96 percent for the standard charge, and 84.5 percent for the charge following the teaching of the present invention.

*Example III*

The procedure of Example I was repeated with charges adapted for the production of soft grey cast iron. The first charge, in accordance with standard practice, comprised 1259 pounds of malleable pig iron, 560 pounds of steel scrap, 60 pounds of ferrosilicon briquettes, and 9 pounds of cement binder. Adjusted for nominal losses to the slag, the nominal size of the batch was 1870 pounds of steel scrap, 60 pounds of ferrosilicon briquettes, composition: silicon, 40.0 weight percent; carbon, chromium, and manganese, nil; the balance, iron and binder.

The second charge, in accordance with the present invention, comprised 715 pounds of malleable pig iron, 1040 pounds of steel scrap, 125 pounds of the novel graphite-silicon briquettes of the present invention, and 10 pounds of cement binder. Again, the nominal size of the charge, adjusted for losses to the slag, was 1870 pounds. The novel graphite-silicon briquettes had the nominal composition: silicon, 31.0 weight percent; carbon 23.4 weight percent; chromium and manganese nil; the balance iron and binder; and a silicon-to-graphite ratio of 1.33.

Each of the charges was fed to cupolas and melted therein. Again, products of substantially the same composition were obtained with no change in melting practice, even though the pig iron-to-steel scrap was about 2.25 for the first charge and about 0.69 for the second. The silicon recovery was 84 percent in each case. The carbon recovery was 87.5 percent for the standard charge, and 83.5 for the charge following the teaching of the present invention.

It will be seen from the examples that great latitude in altering the ratio of pig iron to steel scrap in the charges is provided through the use of the graphite-silicon briquettes of this invention, thereby providing the cupola operator a greater degree of freedom in choice of materials.

*Example IV*

In order to produce soft grey cast iron a cupola charge was prepared containing 17 percent pig iron and 82 percent scrap. Six pounds of silicon per 2400 pounds of charge were added in the form of ferrosilicon briquettes and coke was added to provide a metal to coke ratio of 8.6:1. The charge was melted in an acid lined cupola. Cast chill test bars of the soft grey cast iron product showed non-uniform and substantial depth of chill and relatively large cell size as indicated in FIGURE 1.

*Example V*

The same procedure and charge as in Example IV were followed except that graphite-silicon briquettes of the present invention were employed in the cupola instead of ferrosilicon. The composition of the briquettes was silicon 32.5 weight percent; graphite 16 weight percent; balance iron and binder. Chill test bars of the product soft grey cast iron showed, as indicated in FIGURE 2, substantially less depth of chill and a much finer cell size as compared to the metal obtained using ferrosilicon briquettes.

With more particular reference to the photographs of FIGURES 1 and 2, the bars shown therein are 1 inch diameter test samples prepared from metal as described in Examples IV and V and cast in split metal molds.

The extensive white areas 1 and 1' which appear in the respective photographs indicate depth of chill. The darker portions 2 and 2' indicate the relative eutectic cell size of the metal. It can be observed that the depth of chill in the bar of FIGURE 2 prepared with graphite-containing briquettes of this invention is much more uniform and substantially less than that of the bar of FIGURE 1, and also that the cell size of the material of FIGURE 2 is substantially finer than that of FIGURE 1. This indicates that the metal corresponding to FIGURE 2, produced as in Example V, has less tendency to chill in thin sections, will provide improved mechanical properties and wear resistance, and have generally improved castability. That is to say, the metal produced using graphite-silicon briquettes of this invention has improved fluidity, produces less residual stress in complicated castings, and has better machinability.

This result is surprising and highly beneficial in that it can be obtained by means of treatment in the cupola, i.e., using graphite-silicon briquettes. It has previously been believed that the subsequent treatment in a ladle was necessary to accomplish comparable results.

This application is a continuation-in-part of copending application Serial No. 52,339 filed August 29, 1960.

What is claimed is:

1. A metallurgical briquette useful in the production of grey cast iron having a composition of 25 to 50 weight percent silicon in the form of a material selected from the group consisting of element silicon and silicon containing alloys, 12 to 35 weight percent graphite, 0 to 25 weight percent chromium, 0 to 10 weight percent manganese, 5 to 20 weight percent of an inorganic siliceous binder, and the balance iron and incidental impurities, the ratio of silicon to graphite in said briquette being in the range of from about 1 to 1 up to about 3 to 1.

2. A metallurgical briquette in accordance with claim 1 wherein the inorganic siliceous binder is Portland cement.

3. In a process for the production of grey cast iron wherein pig iron, steel scrap, and a silicon-containing material are charged into a cupola in grey cast iron-producing proportions and melted therein, the improvement which comprises charging said pig iron and said steel scrap in a ratio to provide less than the amount of carbon necessary in the final grey cast iron product and including in the cupola charge, as said silicon containing material, a metallurgical briquette having a composition of 25 to 50 weight percent silicon in the form of a material selected from the group consisting of elemental silicon and silicon containing alloys, 12 to 35 weight percent graphite, 0 to 25 weight percent chromium, 0 to 10 weight percent manganese, 5 to 20 weight percent of an inorganic siliceous binder, and the balance iron and incidental impurities, and the ratio of silicon to graphite being in the range of from about 1 to 1 up to about 3 to 1, said briquette being charged into said cupola in an amount sufficient to supply the additional necessary carbon and silicon.

No references cited.

DAVID L. RECK, *Primary Examiner.*